June 6, 1944.  E. R. BARRETT  2,350,488
COMBINATION DUMP BODY AND LEVELER
Filed Feb. 27, 1941  2 Sheets-Sheet 1
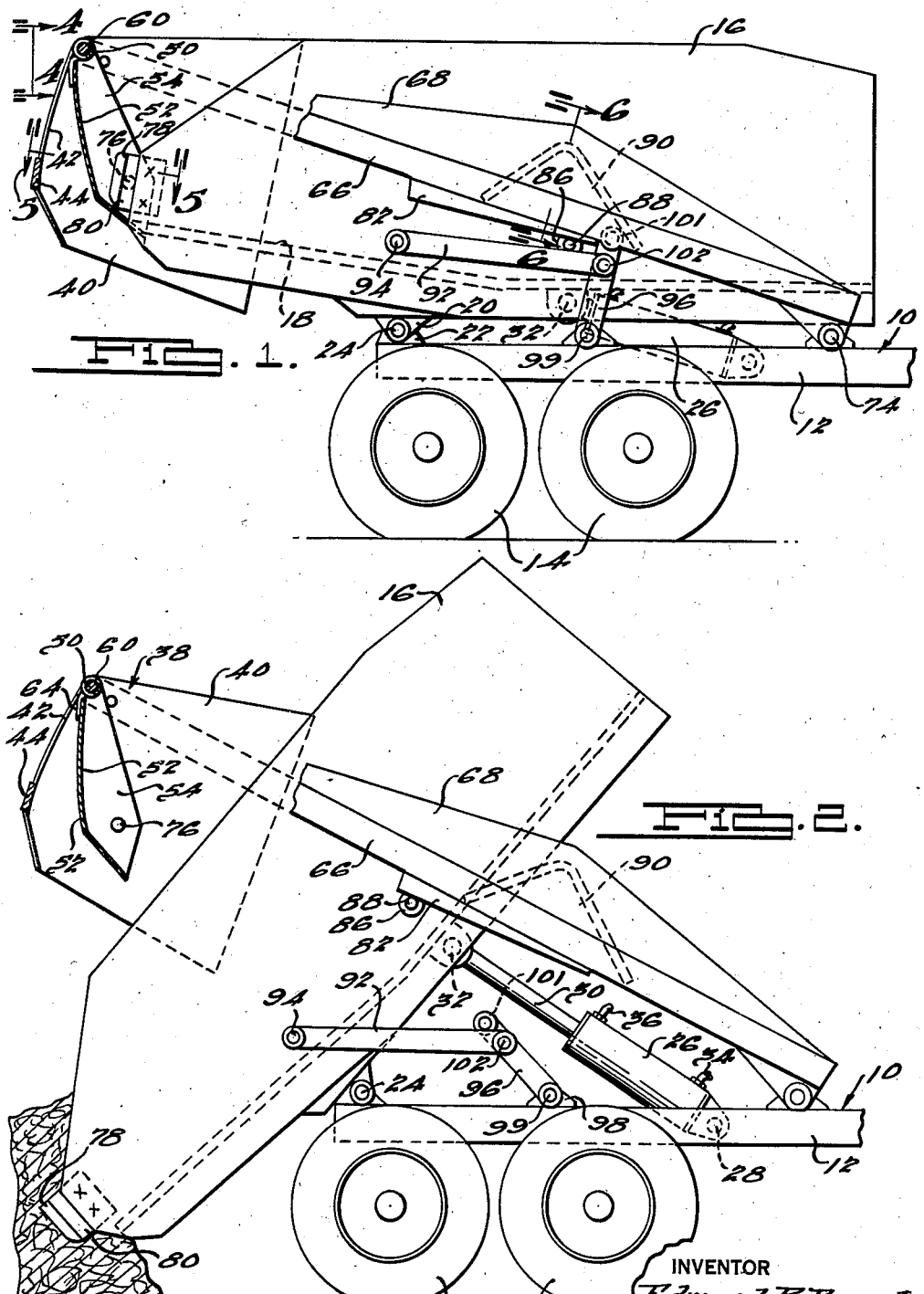
INVENTOR
Edward R. Barrett
BY
Harness, Dickey & Pierce
ATTORNEYS June 6, 1944.    E. R. BARRETT    2,350,488
COMBINATION DUMP BODY AND LEVELER
Filed Feb. 27, 1941    2 Sheets-Sheet 2
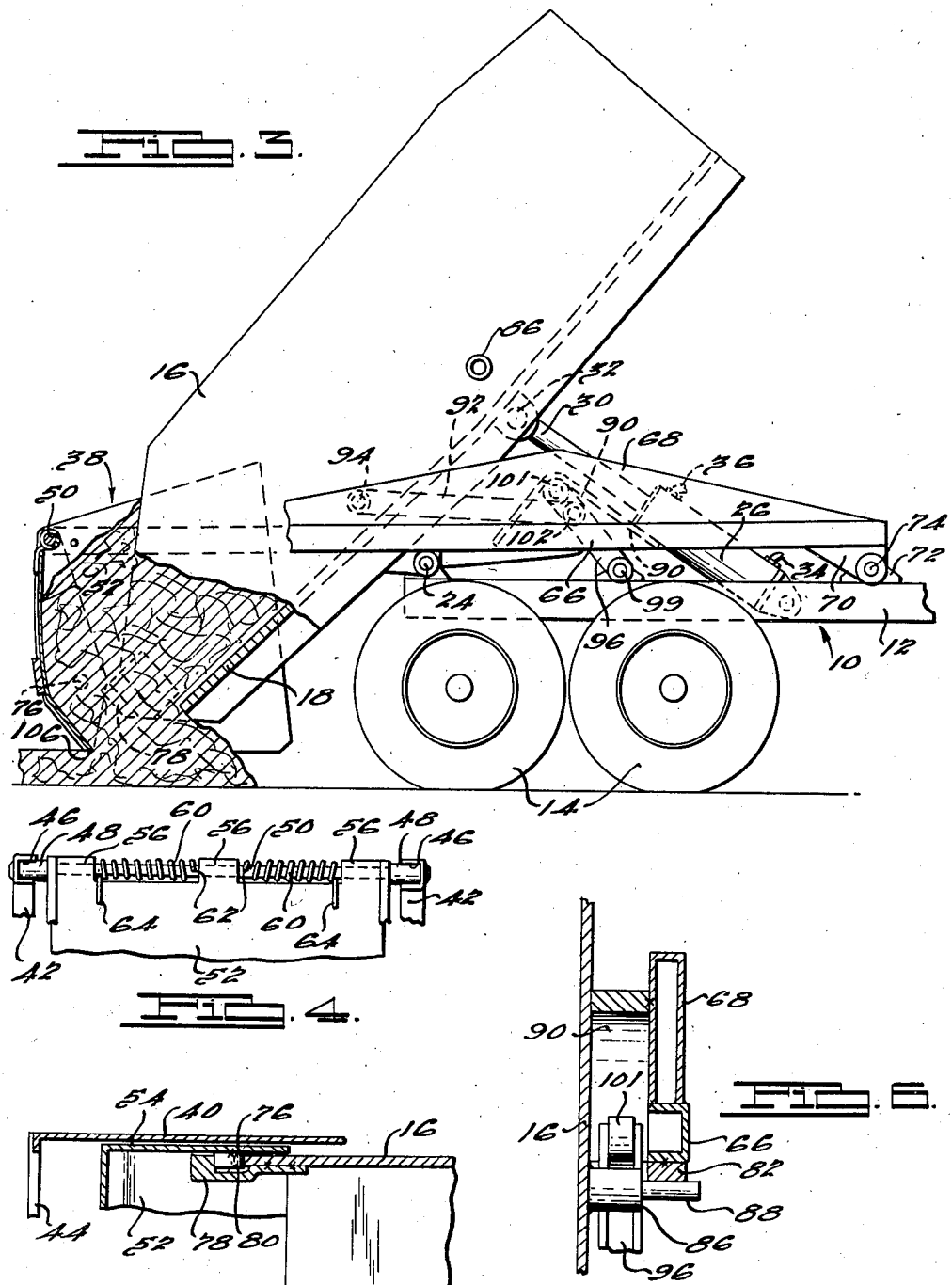
INVENTOR
Edward R. Barrett
BY
Harness, Dickey & Pierce
ATTORNEYS.

Patented June 6, 1944

2,350,488

UNITED STATES PATENT OFFICE 2,350,488

COMBINATION DUMP BODY AND LEVELER

Edward R. Barrett, Detroit, Mich., assignor to Gar Wood Industries, Inc., Detroit, Mich., a corporation of Michigan Application February 27, 1941, Serial No. 380,811

7 Claims. (Cl. 94—44)

The present invention relates to vehicles for handling bulky materials, such as earth, and particularly relates to a combined dump body and material leveler.

One of the primary objects of the present invention is to effect economies in the handling of bulky material, such as earth, by providing a dump truck by which the material carried by the truck may be dumped and leveled at the same time.

A further object of the invention is to provide an improved dump truck construction in which the member forming the rear gate may serve as a leveler during the dumping operation, if desired.

Another object of the invention is to provide an improved rear gate structure by which the payload capacity of the dump truck is increased.

A further object of the invention is to provide a simplified, combination dump body and leveler in which the leveler serves as the rear gate and may be actuated to move out of the way when it is desired to operate the vehicle as a dump body only.

Other objects of the invention will become apparent from the following specification, the drawings relating thereto, and from the claims hereinafter set forth.

In the drawings, in which like numerals are used to designate like parts in the several views throughout:

Figure 1 is a fragmentary, side elevational view, with one of the sides of the rear gate member removed, showing parts in cross-section;

Fig. 2 is a view similar to Fig. 1, showing the body in a tilted position and the structure operated as a dump truck only;

Fig. 3 is a view similar to Fig. 2, showing the structure operated as a dump body and leveler;

Fig. 4 is an elevational view taken substantially along the line 4—4 of Fig. 1;

Fig. 5 is a fragmentary, enlarged cross-sectional view taken substantially along the line 5—5 of Fig. 1; and Fig. 6 is an enlarged, cross-sectional view taken substantially along the line 6—6 of Fig. 1.

Referring to the drawings, an automotive dump truck is generally indicated at 10, which includes the usual chassis 12 having rear ground engaging wheels 14 mounted thereon in the usual way. The cab and engine are not shown in the drawings, but it will be understood that such cab and automotive engine are mounted on the chassis 12 in the usual way.

A dump body is provided which includes upstanding side wall members 16 and a bottom member 18, preferably with the front end closed and with the rear end open to provide the discharge opening for the truck at the rear end of the body. The body is positioned on the chassis, preferably, with the rear end overhanging the rear end of the chassis, and is pivotally connected thereto by means of brackets 20 and 22, connected to the body and chassis, respectively. A pivot pin 24 is received through aligned openings in the brackets 20 and 22 for pivotally mounting the body with respect thereto.

An hydraulic hoist is provided for tilting the body, and such hoist may be of conventional construction, including a cylinder 26 having the lower end thereof pivotally connected to the chassis by means of a pivot pin 28. A piston rod 30 is slidably received through the cap end of the cylinder 26, and is pivotally connected to the underside of the body by means of a pivot pin 32. Fluid, preferably oil, is supplied from a suitable source mounted on the truck in the usual way, and the circuit for such fluid includes the usual inlet conduit 34, which communicates with the lower end of the cylinder 26, and an outlet conduit 36, which communicates with the upper end of the cylinder 26. An hydraulic pump (not shown) supplies the fluid under pressure, and may be driven from a power take-off of the engine in the usual way.

A rear closure member is provided which also serves as a leveler when in the position shown in Fig. 3. Such closure is generally indicated at 38, and includes side wall members 40 having inturned flanges 42 along the rear edge thereof. A transversely extending brace 44 is secured to the flanges 42 to secure the side members 40 together. The upper rear corners of the plate member 40 are formed to provide pockets 46 within which mounting members 48 are fixed. A transversely extending shaft 50 is fixed to the members 48.

A transversely extending, rear closure member 52, having side wall wings 54, is disposed between the side walls 40 of the closure and is formed with bearing apertures 56 along the upper edge thereof. The pivot rod 50 is received through such bearing apertures 56 for pivotally mounting the closure 52 with respect to the side wall members 44.

The closure is positioned over the rear open end of the body with the sides 40 telescopically receiving therein the rear ends of the sides 16 of the body. The closure 52 is resiliently urged toward the body by means of springs 60, each of which is wound about the rod 50, having one end 62 fixed thereto and having the other end 64 thereof bearing against the rear face of the member 52.

The rear closure is mounted to the chassis on both sides thereof by means of longitudinally extending members, including a longitudinally extending channel member 66 having an elongated member 68, which is U-shaped in cross-section, welded to the upper surface thereof and extending therealong. Such mounting members are provided on the opposite side of the body and have their rear ends welded to the sides 40 of the rear closure. A bracket 70 is fixedly secured to the forward end of each of the members 66, and is pivotally secured to a bracket 72, mounted on the chassis 12, by means of a pivot pin 74. The entire rear closure, including the side walls 40 and the transverse closure 52, may thus be pivoted with respect to the body and with respect to the chassis, as shown in the various figures.

The body and rear closure are shown in Fig. 1 in their normal or horizontal positions, which they assume when the body is being loaded or when the load is being transported.

In order to hold the rear closure member 52 in its closed position when the body 16 is horizontal, or when the body is in its normal position, a disc member 76 is secured to the inside face of each of the wings 54. A plate member 78 is welded to each of the sides 16, and projects rearwardly beyond the rear edge thereof adjacent the floor 18. Such members 78 are provided with upright channels 80 therethrough which are adapted to receive therein their adjacent discs 76. When the body is tilted, the discs will pass either out of or into the channels 80, thus either unlocking or locking the rear closure member 52 with respect to the body.

A wedge-shaped member 82 is welded to the under edge of each of the members 66 at a position between the pivot pins 74 and 24. A tubular member 86 is welded to each of the side walls 16 on the outside surface thereof, and each is adapted to removably receive therein a pin 88. When the body is in the position shown in Fig. 1, the removable pins are adapted to bear against the under edges of the member 82 and thus hold the rear closure member in position with respect to the body. When the body is tilted to the position shown in Fig. 2, as the body tilts, the pins 88 in bearing against the under surfaces of the wedge members 82 raise the rear closure member to the position shown in Fig. 2, so that it is moved upwardly out of the way of the rear dumping opening. The dump truck may thus be operated as an ordinary dump body.

When, however, it is desired to operate the truck as a dump body and level the material being discharged therefrom at the same time, a connection between the members 66 and the body is provided which includes a cam guideway 90, in the form of an angle member which is welded to the inside faces of members 68 and 66, as shown in Fig. 6. Linkage means are provided which include a link 92 pivotally connected to the body by means of a pivot pin 94. Another link 96 is pivotally connected to a bracket 98, mounted on the chassis 12, by means of a pivot pin 99. A roller 101 is pivotally mounted to the upper end of the link 96. The rear end of the link 92 is pivotally connected to the link 96 intermediate the ends thereof by means of a pivot pin 102. It will be understood that there are similar guide means 90 and link means 92 and 96, together with their associated parts, provided on each side of the vehicle.

The links 92 and 96 are so constructed and arranged that the roller 101 engages the guide surface 90, as shown in Fig. 1, when the parts are in their horizontal position. The parts are so arranged that the removable pins 88 may either be inserted or removed when the body is in such position. When the pins 88 are removed, the rear closure and the longitudinally extending side members 66 and 68 are operatively connected to the body 16 through engagement of the rollers 101 with the guideways 90. As the body is tilted, the rollers roll along the guides 90 in engagement therewith from the position shown in Fig. 1 to that shown in Fig. 3. The rollers will then be in the corners of the angle members, thus limiting their movement.

When in the position shown in Fig. 3, the rear closure member 52 has been released from engagement with the member 80, and the weight of the dirt will force it away from the rear opening of the body. It will thus be seen that the lower edge 106 of the rear closure 52 is below the bottommost point of the body 18, and is at a predetermined height above the ground. The dirt from the body may thus be dumped through the opening between the rear edge of the bottom 18 and the bottom edge 106 and, by moving the truck forwardly at the same time, the member 52 serves to level the dirt as it is being discharged from the body.

When the body is returned to its horizontal position, the roller will move along the member 90 and raise the closure to its initial, normal position, shown in Fig. 1, so that the member 52 is again resiliently urged toward the body and is latched to the member 78.

Formal changes may be made in the specific embodiment of the invention described without departing from the spirit and substance of the invention, the scope of which is commensurate with the appended claims.

What is claimed is:

1. In combination, a vehicle having a chassis, a body adapted to carry material and having a discharge opening therein, means pivotally mounting said body on said chassis for dumping through said opening, a closure member adapted to be positioned adjacent the opening, and means pivotally mounting said closure member on said chassis, and means operatively connecting said last named means with said body so that when said body is tilted said closure member moves downwardly to a position adjacent said opening to level material discharged through said opening.

2. In combination, a vehicle having a chassis, a body adapted to carry material and having a discharge opening in the rear end thereof, means pivotally mounting said body on said chassis for dumping through said opening, a rear closure member adapted to be positioned adjacent said rear opening, and means pivotally mounting said closure member on said chassis, and means operatively connecting said last named means with said body so that when said body is tilted said closure member is moved downwardly to a position to level material discharged through said opening.

3. In combination, a vehicle having a chassis, a body adapted to carry material and having a discharge opening in the rear end thereof, means pivotally mounting said body on said chassis for dumping through said rear opening, a closure member having sides which overlap the sides of the rear end of said body and having a transverse closure portion adapted to be positioned adjacent said opening, and means mounting said closure member adjacent said opening, said last named means including members fixedly connected to said closure member and extending longitudinally of said body along the sides thereof, means pivotally connecting said last named members to said chassis, and linkage means connected to said body and to said chassis, said linkage means having a member mounted thereon which engages a guide member on one of said longitudinally extending members for controlling the movement of said closure member when said body is tilted.

4. In combination, a vehicle having a chassis, a body adapted to carry material and having a discharge opening in the rear end thereof, means pivotally mounting said body on said chassis for dumping through said rear opening, a closure including side wall members and a rear wall member, means pivotally mounting said rear wall member with respect to said side wall members, said closure being positioned adjacent said opening so that said side wall members overlap the sides of the rear end of the said body and said rear wall member extends transversely of said opening, means mounting said closure for movement with respect to said opening, said last named means including members connected to said closure and extending longitudinally of said body along the sides thereof, means pivotally connecting said last named members to said chassis, linkage means connected to said body and to said chassis, said linkage means having a roller member mounted thereon which engages a guide member on one of said last named members for controlling the movement of said closure when said body is tilted.

5. In combination, a vehicle having a chassis, a body adapted to carry material and having a discharge opening in the rear end thereof, means pivotally mounting said body on said chassis for dumping through said rear opening, a closure including side wall members and a rear wall member, means pivotally mounting said rear wall member with respect to said side wall members, said closure being positioned adjacent said opening so that said side wall members overlap the sides of the rear end of the said body and said rear wall member extends transversely of said opening, means mounting said closure for movement with respect to said opening, said last named means including members rigidly connected to the side wall members of said closure and extending longitudinally of said body along the sides thereof, means pivotally connecting said last named members to said chassis forwardly of the pivotal connection of said body with said chassis, and means operatively connecting said last named members to said body to control the movement of said closure when said body is tilted.

6. In combination, a vehicle having a chassis, a body adapted to carry material and having a discharge opening in the rear end thereof, means pivotally mounting said body on said chassis for dumping through said rear opening, a closure including side wall members and a rear wall member, means pivotally mounting said rear wall member with respect to said side wall members, said closure being positioned adjacent said opening so that said side wall members overlap the sides of the rear end of the said body and said rear wall member extends transversely of said opening, means mounting said closure for movement with respect to said opening, said last named means including members fixedly connected to said closure and extending longitudinally of said body along the sides thereof, means pivotally connecting said last named members to said chassis, a guide member secured to one of said last named members, and a member mounted on said body and adapted to engage said guide member to raise said last named members and to thereby raise said closure when said body is tilted.

7. In combination, a vehicle having a chassis, a body adapted to carry material and having a discharge opening in the rear end thereof, means pivotally mounting said body on said chassis for dumping through said rear opening, a closure including side wall members and a rear wall member, means pivotally mounting said rear wall member with respect to said side wall members, said closure being positioned adjacent said opening so that said side wall members overlap the sides of the rear end of the said body and said rear wall member extends transversely of said opening, means mounting said closure for movement with respect to said opening, said last named means including members connected to said closure and extending longitudinally of said body along the sides thereof, means pivotally connecting said last named members to said chassis, a guide member secured to one of said last named members, and a removable member mounted on said body and adapted to engage said guide member to raise said last named members and to thereby raise said closure when said body is tilted.

EDWARD R. BARRETT.